United States Patent
Nomura et al.

(10) Patent No.: US 8,384,911 B2
(45) Date of Patent: Feb. 26, 2013

(54) MEASUREMENT DEVICE AND MEASUREMENT METHOD

(75) Inventors: Osamu Nomura, Tokyo (JP); Masakazu Matsugu, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/281,883

(22) Filed: Oct. 26, 2011

(65) Prior Publication Data
US 2012/0105868 A1   May 3, 2012

(30) Foreign Application Priority Data
Oct. 29, 2010  (JP) ................. 2010-244369

(51) Int. Cl.
*G01B 11/24* (2006.01)
(52) U.S. Cl. ........ 356/610; 356/625; 356/603; 382/108; 382/152; 382/154
(58) Field of Classification Search .......... 356/601–625; 382/106–108, 152–154
See application file for complete search history.

(56) References Cited

U.S. PATENT DOCUMENTS

| | | | |
|---|---|---|---|
| 6,369,899 B1 * | 4/2002 | Hamada ................. | 356/604 |
| 7,092,563 B2 * | 8/2006 | Shiratani ................ | 356/610 |
| 7,454,054 B2 * | 11/2008 | Fukumoto ............. | 382/154 |

FOREIGN PATENT DOCUMENTS
JP   2006-292385 A   10/2006

OTHER PUBLICATIONS

D. G. Lowe's "Fitting parameterized three-dimensional models to images", IEEE Transactions on Pattern Analysis and Machine Intelligence, vol. 13, No. 5, pp. 441-450, 1991.

L. Vacchetti, V. Lepetit, and P. Fua's "Combining edge and texture information for real-time accurate 3D camera tracking", Proc. ISMAR04, pp. 48-57, 2004.

V. Lepetit, and P. Fua's "Keypoint recognition using randomized trees" IEEE Transactions on Pattern Analysis and Machine Intelligence, vol. 28, No. 9, 2006.

* cited by examiner

Primary Examiner — Gregory J Toatley
Assistant Examiner — Iyabo S Alli
(74) Attorney, Agent, or Firm — Canon U.S.A., Inc. IP Division

(57) ABSTRACT

A measurement device includes a pattern light characteristic setting unit configured to set illumination light having a pattern light characteristic to be projected onto a measurement object, a reflected light measurement unit configured to measure reflected light when the measurement object is irradiated with the illumination light on, an image feature extraction unit configured to extract from the measured reflected light an image feature based on a physical characteristic of the measurement object, a feature distribution calculation unit configured to calculate a distribution characteristic for each local region of the image feature, and a pattern light control unit configured to control the pattern light characteristic of the illumination light, which includes a pattern light characteristic for distance measurement and a pattern light characteristic for image feature extraction, based on the calculated distribution characteristic for each local region.

8 Claims, 13 Drawing Sheets

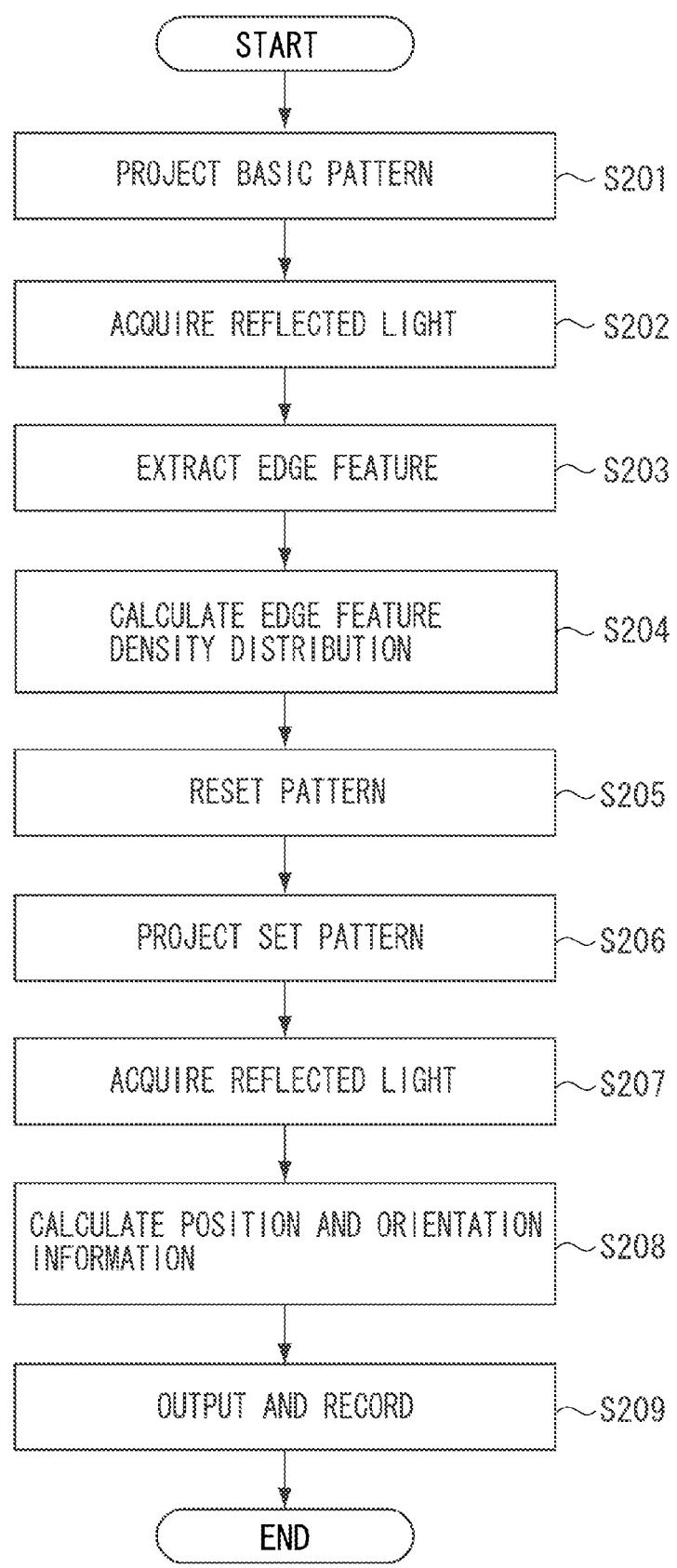

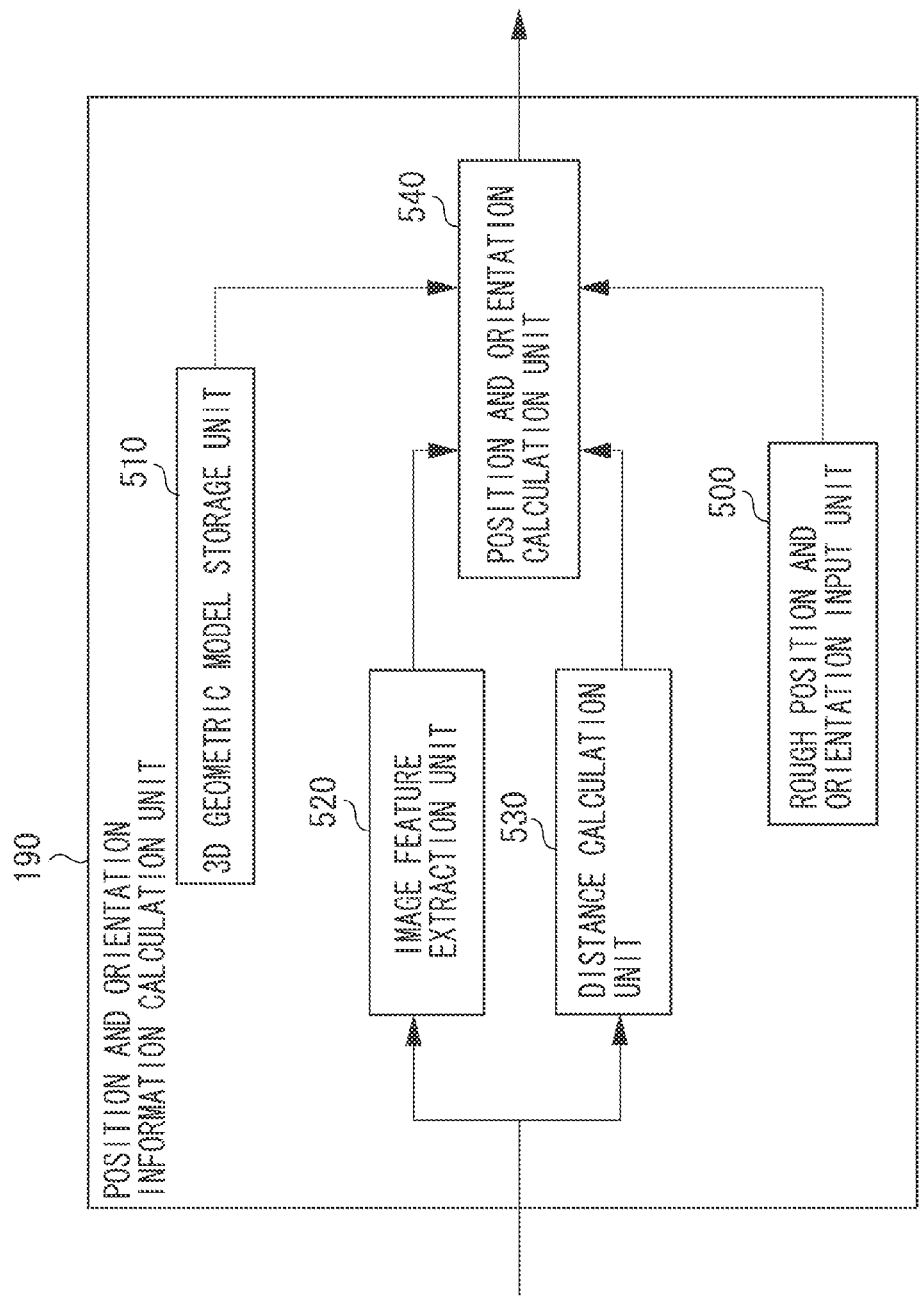

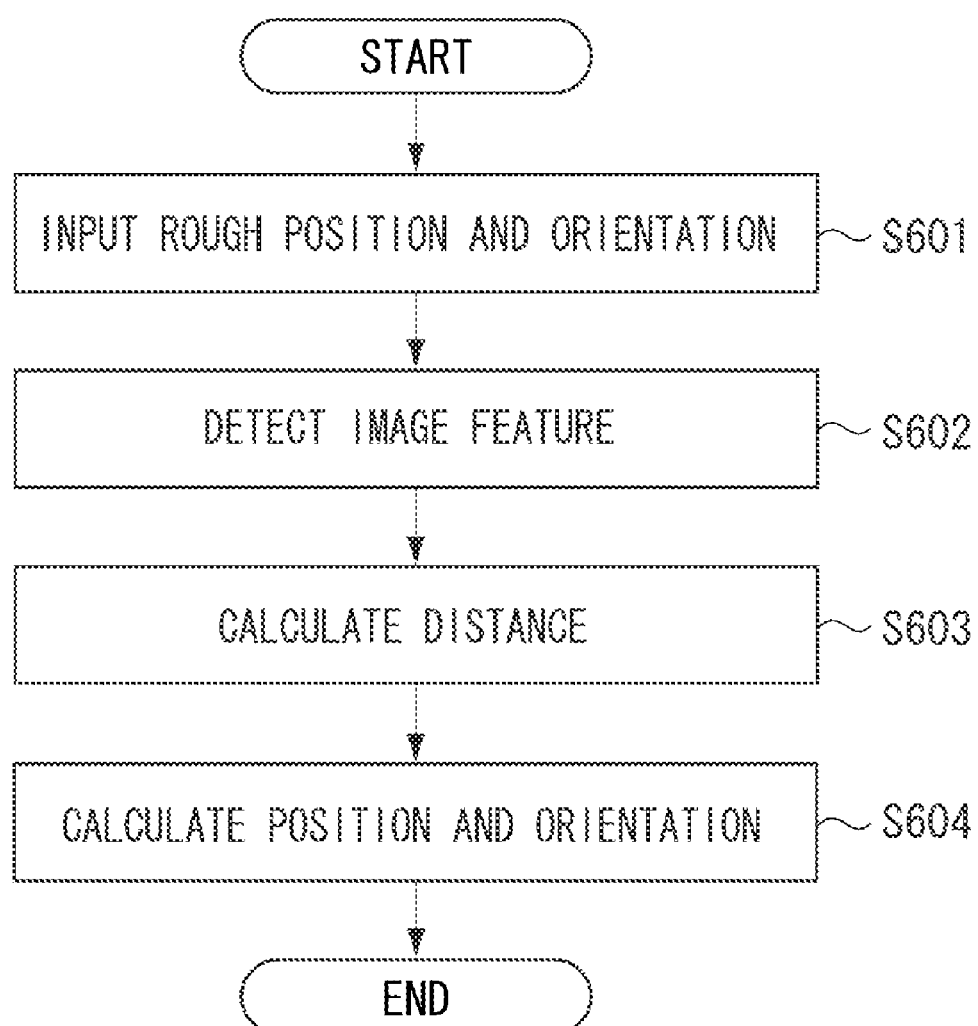

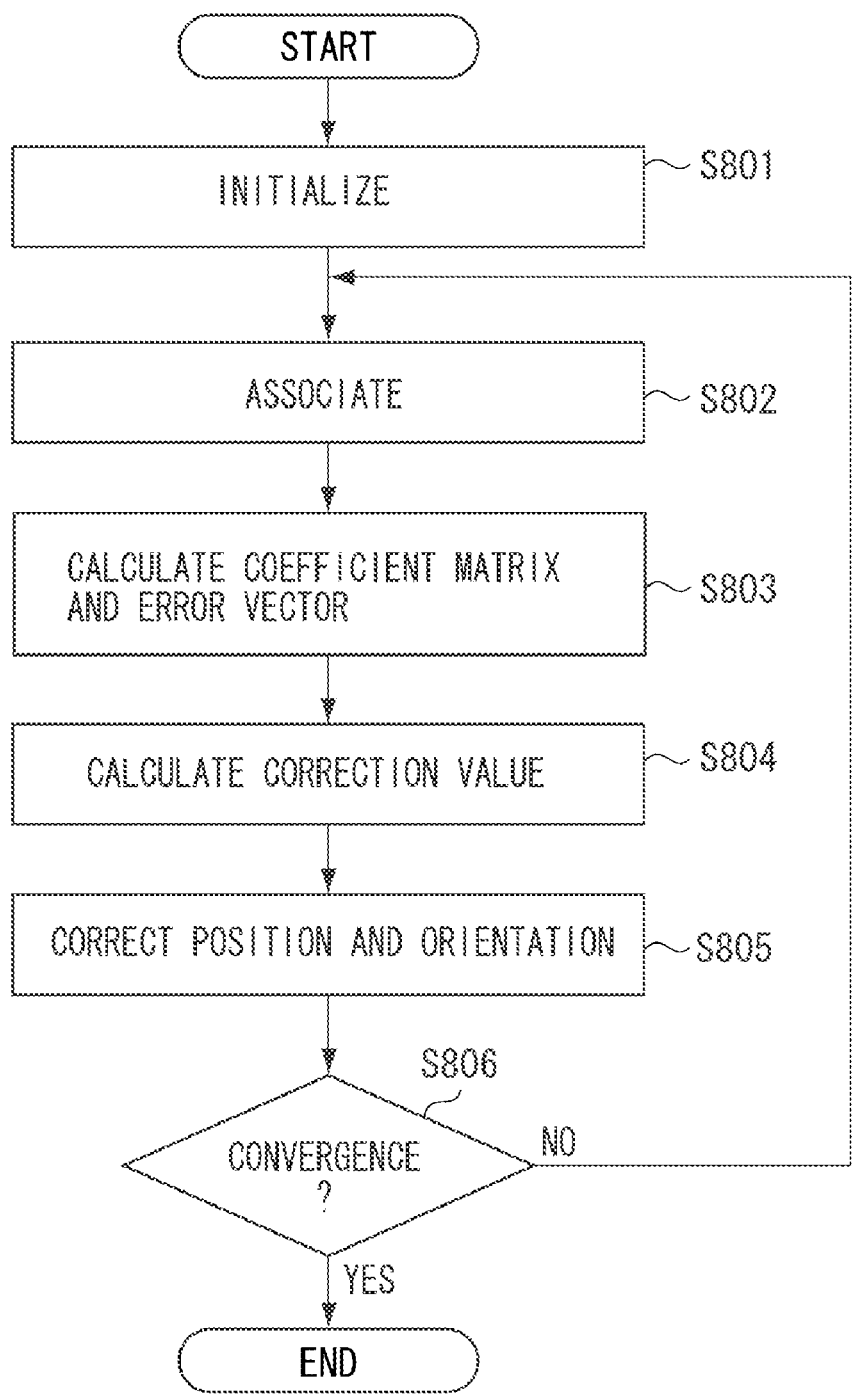

MEASUREMENT DEVICE AND MEASUREMENT METHOD

BACKGROUND OF THE INVENTION

1. Field of the Invention

The present invention relates to a measurement device and a measurement method for measuring the position and the orientation of an object by irradiating the object with light and measuring the reflected light.

2. Description of the Related Art

Conventionally, pattern projection methods which measure a surface profile by irradiating a measurement object with pattern light have been known. Various proposals have been made regarding methods for calculating the surface profile and methods for controlling the pattern light.

For example, Japanese Patent Application Laid-Open No. 2006-292385 discusses a configuration for adaptive control of the combination and number of pattern lights irradiated by a spatial light modulation element based on a feature amount of a captured image or changes in the feature amount by irradiating a measurement object with pattern light.

In the technique discussed in Japanese Patent Application Laid-Open No. 2006-292385, it is necessary to use a plurality of slit lights.

Further, to execute position and orientation measurement of a measurement object, it is desirable to acquire information that matches the actual environment, such as the illumination environment, in just a few imaging operations. Consequently, it is desirable that a measurement object image feature and distance image are simultaneously acquired.

SUMMARY OF THE INVENTION

The present invention is directed to simultaneously acquiring an image feature and a distance image by changing the characteristics of the pattern projected on a measurement object, based on a distribution characteristic of an image feature of the measurement object.

According to an aspect of the present invention, a measurement device includes a setting unit configured to set illumination light having a pattern light characteristic to be projected onto a measurement object, a reflected light measurement unit configured to measure reflected light when the measurement object is irradiated with the illumination light, an extraction unit configured to extract from the measured reflected light an image feature based on a physical characteristic of a measurement object, a calculation unit configured to calculate a distribution characteristic for each local region of the image feature, and a control unit configured to control the pattern light characteristic of the illumination light, which includes a pattern light characteristic for distance measurement and a pattern light characteristic for image feature extraction, based on the calculated distribution characteristic for each local region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating a measurement processing flow.

FIG. 5 illustrates a configuration of a position and orientation information calculation unit.

FIG. 6 is a flowchart illustrating a calculation procedure of position and orientation information.

FIG. 8 is a flowchart illustrating a calculation procedure of position and orientation information.

DESCRIPTION OF THE EMBODIMENTS

Various exemplary embodiments, features, and aspects of the invention will be described in detail below with reference to the drawings.

Figure 1:
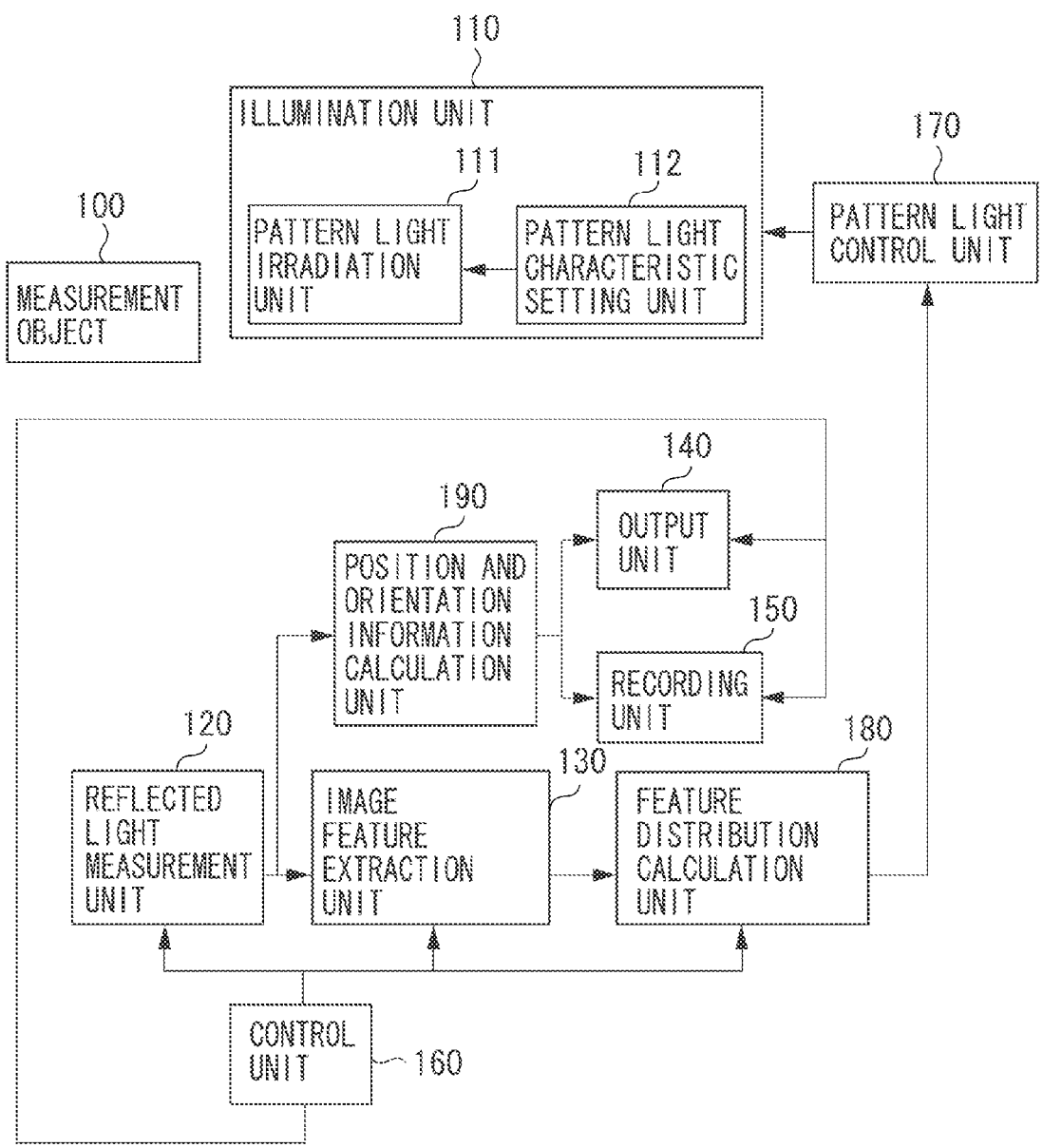
FIG. 1 illustrates a configuration of a measurement device.

FIG. 1 illustrates a configuration of a measurement device for measuring three-dimensional (3D) information about a measurement object by projecting pattern light. In this pattern light, a pattern light characteristic for distance measurement and a pattern light characteristic for image feature extraction are mixed.

An illumination unit 110 irradiates a measurement object 100. A pattern light irradiation unit 111 is mounted in the illumination unit 110 for irradiating the measurement object 100. A pattern light characteristic setting unit 112 sets a pattern light characteristic of the illumination light irradiated from the pattern light irradiation unit 111. The pattern light characteristic is set based on a distribution characteristic for each local region of an image feature when the measurement object 100 is captured as an image. The method for setting the pattern light characteristic based on a distribution characteristic for each local region of an image feature will be described below.

A reflected light measurement unit 120 includes a light sensor for detecting reflected light from the measurement object 100. The reflected light measurement unit 120 measures the reflected light by capturing the measurement object 100 as an image.

An image feature extraction unit 130 extracts an edge feature in the image as an image feature that is determined based on a physical characteristic of the measurement object 100, from the image captured by the reflected light measurement unit 120. The method for extracting the edge feature will be described below.

A feature distribution calculation unit 180 calculates a distribution characteristic for each local region in the image of the image feature extracted by the image feature extraction unit 130. The method for calculating the distribution characteristic will be described below.

An output unit 140 outputs a result of a calculation result performed by a below-described position and orientation information calculation unit 190. The output unit 140 has, for example, a monitor or a printer for displaying the calculation result.

A recording unit 150 records the result of the calculation performed by the position and orientation information calculation unit 190. The recording unit 150 includes a hard disk, a flash memory and the like for recording calculation result data.

A control unit 160 controls operation of the reflected light measurement unit 120, the image feature extraction unit 130, the feature distribution calculation unit 180, the output unit 140, and the recording unit 150. The control unit 160 includes, for example, a central processing unit (CPU), a random access memory (RAM), and a read-only memory (ROM) in which various control programs are stored.

Examples of the various control programs stored in the ROM include control programs for controlling the reflected light measurement unit 120, the image feature extraction unit 130, the feature distribution calculation unit 180, the output unit 140, and the recording unit 150, respectively. To prevent the figure from becoming complex, the lines from the control unit 160 toward the output unit 140 and the recording unit 150 are omitted in FIG. 1.

A pattern light control unit 170 controls the pattern light characteristic of the light irradiated by the illumination unit 110 based on information relating to the distribution characteristic for each local region of the image feature in the image which is calculated by the feature distribution calculation unit 180 with respect to the measurement object 100. The method for controlling the pattern light characteristic will be described below. The pattern light control unit 170 may be included as a function of the control unit 160.

The position and orientation information calculation unit 190 calculates the position and the orientation based on an image captured with pattern light projected onto the measurement object. This pattern light mixes a pattern light characteristic for distance measurement and a pattern light characteristic for image feature extraction. During this process, the position and the orientation are calculated as 3D information about the measurement object by using information about the image feature extracted from the image and distance data in a complementary manner. The method for calculating the position and orientation will be described below.

FIG. 2 is a flowchart illustrating a flow of the processing performed by the measurement device according to the present exemplary embodiment. The flow of the processing according to the present exemplary embodiment will be described using FIG. 2. In the following description, a liquid crystal projector is used as the illumination unit 110.

In step S201, the control unit 160 transmits a basic pattern light setting signal to the illumination unit 110, and sets the illumination light characteristic of the light irradiated by the illumination unit 110 on the measurement object 100 as the basic pattern light. In the present exemplary embodiment, as the basic pattern light for image feature extraction, uniform white light is set so that light is irradiated in a spatially uniform manner. Then, the illumination unit 110 irradiates the measurement object 100 with the set uniform white light.

Figure 3A:
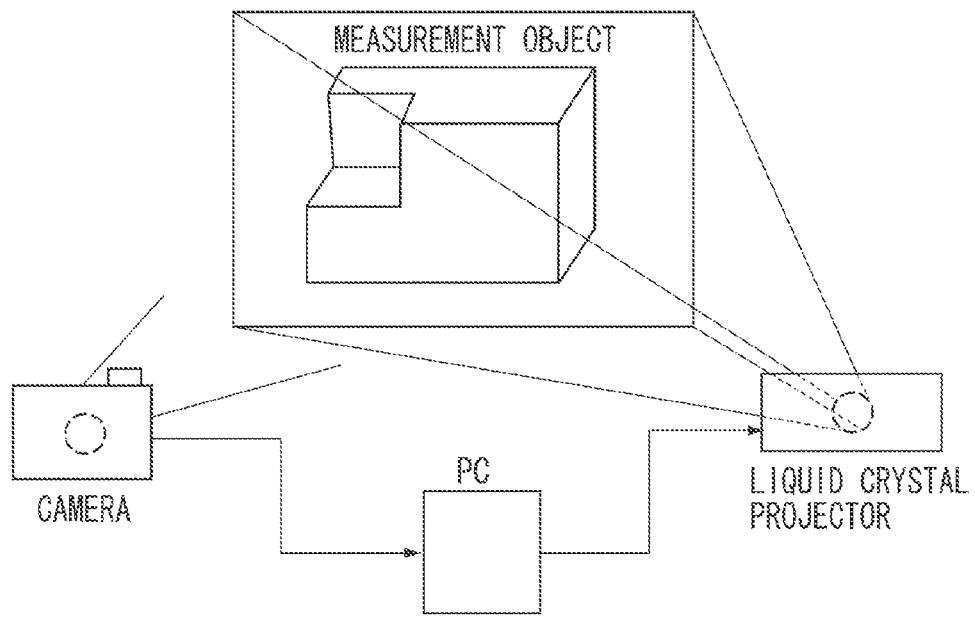
FIGS. 3A and 3B illustrate examples in which a measurement object is irradiated with uniform white light.
Figure 3B:
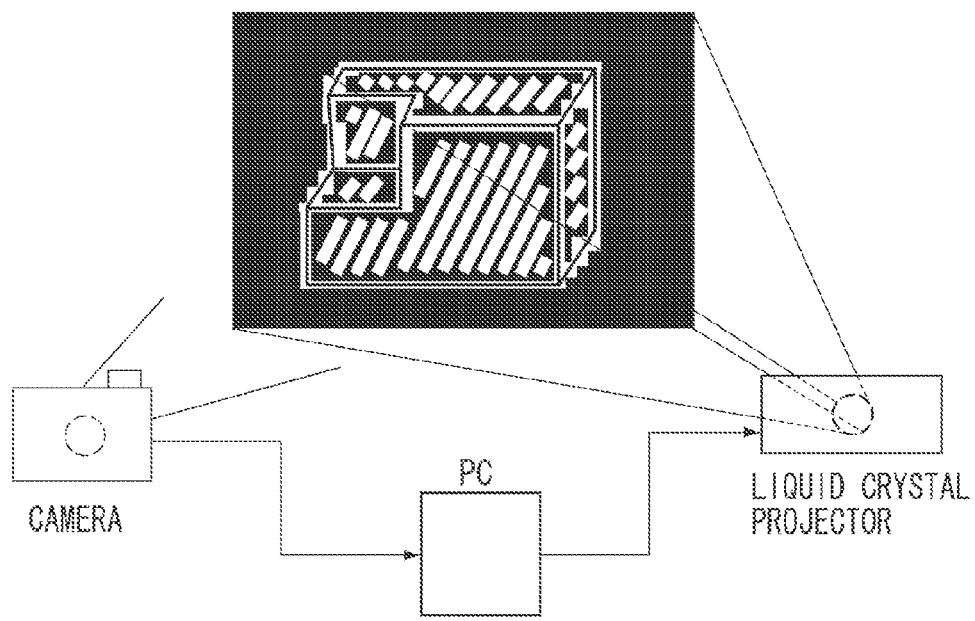

FIGS. 3A and 3B illustrate examples in which uniform white light is irradiated from an illumination unit on a measurement object. FIG. 3A is a pattern diagram illustrating an example of the configuration when a liquid crystal projector is used for the pattern light projection. FIG. 3B illustrates a configuration in which pattern light is projected on a measurement object, and the reflected light is captured by a camera. Although in the present exemplary embodiment the pattern light setting is performed with a personal computer (PC), the pattern light setting may also be performed in a camera or in the liquid crystal projector. The resolution of the pattern that can be projected by the liquid crystal projector is determined based on the resolution of the liquid crystal projector.

In step S202, the reflected light measurement unit 120 measures the reflected light of the measurement object 100. As illustrated in FIG. 3B, the measurement of the reflected light by the reflected light measurement unit 120 corresponds to the capturing of an image of the measurement object 100 by a camera in a state in which the pattern light is irradiated from the illumination unit 110.

In step S203, the image feature extraction unit 130 extracts information about the image feature in the captured image. As described above, the image feature in the present exemplary embodiment is an edge feature in the image. While many ways of extracting an edge feature from an image have been proposed, in the present exemplary embodiment, an edge extraction method using a Laplacian filter is employed. However, as the edge extraction method, some other filter, such as a Sobel filter, a Prewitt filter, a Canny method, or other filters or algorithm may be employed.

Figure 4A:
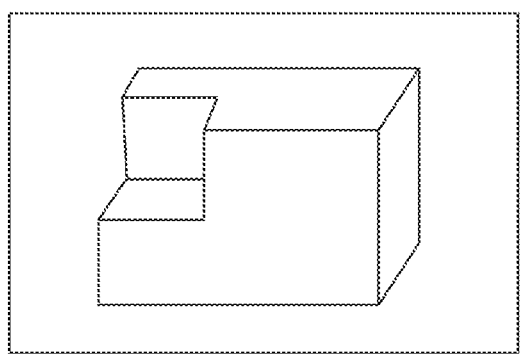
FIGS. 4A, 4B, 4C, and 4D illustrate images produced by irradiation.

FIG. 4A illustrates an example of a result of an edge feature extracted by a Laplacian filter from the above-described image. In the edge feature extraction result, information about the presence of an edge is indicated at an 8-bit value for each pixel. Near sections where a measurement object edge is present, the edge feature is densely extracted, while at portions having some other surface profile and having little patterning, the edge feature is sparsely extracted. In FIG. 4A, it can be seen that the edge feature is densely extracted at the sections where a measurement object edge is present, while the edge feature is scarcely extracted at other sections.

In step S204, the feature distribution calculation unit 180 calculates the distribution characteristic of the edge feature for each local region in the image based on the edge feature extracted in step S203. In the present exemplary embodiment, "distribution characteristic of the edge feature" means the density distribution of the edge feature in the image. Further, in the present exemplary embodiment, the image region is divided into small regions with respect to the extraction result of the edge feature illustrated in FIG. 4A.

For example, if the size of the image in the present exemplary embodiment is 640×480 pixels, as an example, the overall image may be divided into 40×40 regions in which the pixel size of the small regions is 16×12. The distribution characteristic of the edge feature in each small region is calculated by adding the value of the edge feature extraction result at the pixel positions included in each small region. The edge feature distribution characteristic in each small region is determined as being either dense or sparse based on a comparison of whether the distribution characteristic is greater/less than a predetermined threshold.

Figure 4B:
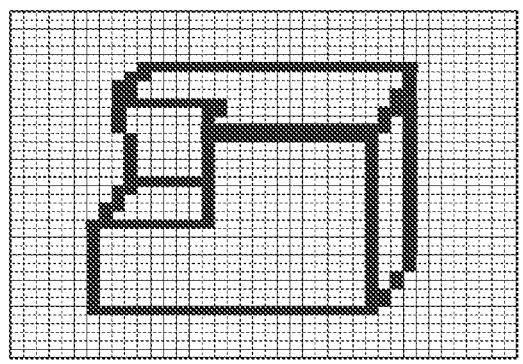

In FIG. 4B, the small regions determined as having a dense edge feature distribution characteristic are blacked out. Based on a comparison of FIGS. 4A and 4B, it can be seen that the edge feature is densely calculated at small regions near sections where a measurement object edge is present, while the edge feature is sparsely calculated at portions having a surface profile that does not include an edge and having little patterning.

Figure 4C:
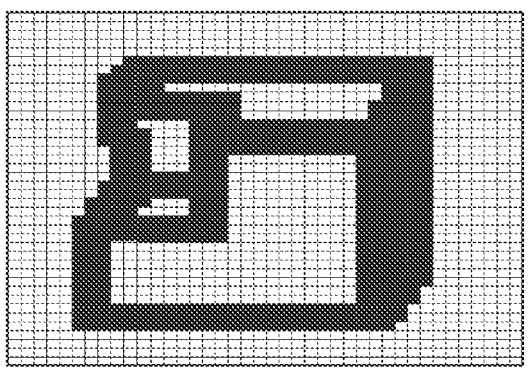

As illustrated in FIG. 4C, so that all the small regions including a measurement object edge are selected without omission, the small regions adjacent to a small region having a dense edge calculation may similarly be deemed to be regions in which an edge was densely calculated. In FIG. 4C, the small regions adjacent to the small regions blacked out in FIG. 4B are also blacked out.

In step S205, the pattern light control unit 170 sets a characteristic of the pattern light to be irradiated based on the density distribution of the edge feature in the image calculated in step S204. Specifically, pattern light is set in which two types of light are mixed. Uniform white light is projected on the edge feature dense portions as the pattern light for image feature extraction, and pattern light for distance measurement is projected on image feature sparse portions. In the present exemplary embodiment, slit light is described as an example of the pattern light for distance measurement.

The pattern light control unit 170 sends to the illumination unit 110 the pattern light setting signal in which uniform white light for image feature extraction and pattern light for distance measurement are mixed. Based on this pattern light setting signal, the pattern light characteristic setting unit 112 resets the illumination light characteristic.

Since there is typically an offset in the arrangement of the reflected light measurement unit 120 and the illumination unit 110, the position and orientation information calculation unit 190 converts positions on the image captured by the reflected light measurement unit 120 into pixel positions of illumination pattern of the illumination unit 110 by utilizing the geometrical relationship between the reflected light measurement unit 120 and the illumination unit 110. Specifically, based on the geometrical relationship, the position and orientation information calculation unit 190 calculates in advance a planar homography that represents a one-to-one conversion of planar points, and uses this for the conversion.

In the present exemplary embodiment, the region on which the pattern light for image feature extraction falls and the region on which the pattern light for distance measurement falls is set based on the above-described method. However, some other method may also be used. For example, the size of the small regions may be arbitrarily set.

Further, different from the above-described method, adjacent small regions may be set so as to partially overlap. Furthermore, the image feature distribution characteristic may be calculated by searching for continuous edges, instead of setting the small regions as described above. In addition, some other method may be employed to search for regions in the image in which measurement object edges are densely present.

In step S206, the illumination unit 110 irradiates the measurement object 100 with the reset pattern.

Figure 4D:
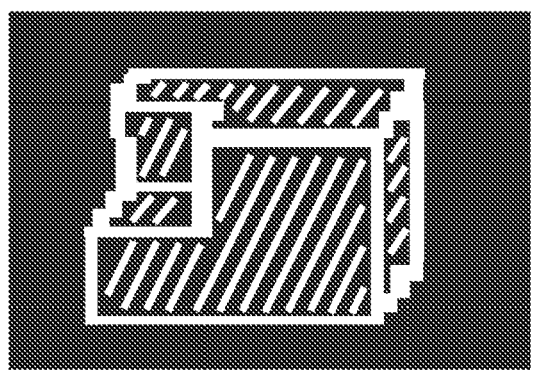

In step S207, the reflected light measurement unit 120 measures the reflected light of the measurement object 100 in the same manner as in step S202. FIG. 4D illustrates an example of a captured image. From FIG. 4D, it can be clearly seen that uniform white light for image feature extraction is projected near the edges of the measurement object 100, and that slit light is projected as pattern light for distance measurement on surfaces other than the edges.

In step S208, the position and orientation information calculation unit 190 calculates position and orientation information from the image captured in step S207. Specifically, edge information is extracted as the image feature, concerning the sections in the image where the uniform white light for image feature extraction is projected, and distance data is calculated based on the imaging situation of the pattern light in the image, concerning sections in the image where pattern light for distance measurement is projected. Furthermore, the position and orientation information about the measurement object is calculated using the extracted edge information and the calculated distance data in a complementary manner. The method for calculating this position and orientation information will be described below.

In step S209, based on control from the control unit 160, the output unit 140 and the recording unit 150 output and record the calculation result of the position and orientation information about the measurement object 100. The output unit 140 displays the calculation result of the position and orientation information about the measurement object 100 on a monitor, for example. The recording unit 150 stores the calculation result of the position and orientation information about the measurement object 100 as digital data in a hard disk or a flash memory, for example.

An example of the method for calculating the position and orientation information will now be described in detail. As illustrated in FIG. 5, the position and orientation information calculation unit 190 includes a rough position and orientation input unit 500, a 3D geometric model holding unit 510, an image feature extraction unit 520, a distance calculation unit 530, and a position and orientation calculation unit 540. The 3D geometric model holding unit 510 has acquired a 3D geometric model of the measurement object in advance.

FIG. 6 is a flowchart illustrating a procedure according to the present exemplary embodiment performed by the position and orientation information calculation unit 190 to measure the position and orientation of a measurement object.

In step S601, the rough position and orientation input unit 500 inputs a rough value of the position and the orientation for the measurement device according to the present exemplary embodiment into the position and orientation calculation unit 540. Examples of the rough value of the position and the orientation of the object include the position and the orientation as measured at a previous time, a predicted value of the position and the orientation that includes an estimate of movement such as velocity or angular velocity, and a measurement value obtained from another sensor. In the present exemplary embodiment, the position and the orientation as measured at a previous time are used.

In step S602, the image feature extraction unit 520 extracts an image feature from the image captured in step S207. In the present exemplary embodiment, an edge is extracted as the image feature. An edge is a point where a density gradient shows an extreme value. Unlike the Laplacian filter employed for the edge extraction to determine the pattern light characteristic performed in step S203, the position and orientation information calculation unit 190 performs edge detection based on a method discussed in D. G. Lowe's "Fitting parameterized three-dimensional models to images", IEEE Transactions on Pattern Analysis and Machine Intelligence, Vol. 13, No. 5, pp. 441-450, 1991.

More specifically, the edge feature distribution used to determine the pattern light characteristic in step S203 does not necessarily need to have a high level of positional accuracy for the image, as long as regions in which the edge feature are densely distributed in the image can be determined. On the other hand, in the position and orientation information calculation processing described below, a method that can more accurately detect the positions where edges are present is used to accurately calculate the position and the orientation of the measurement object.

However, the edge extraction method should be determined based on the desired extraction accuracy of the edge feature. Therefore, the edge feature extraction method is not limited to that described in the present exemplary embodiment.

Figure 7A:
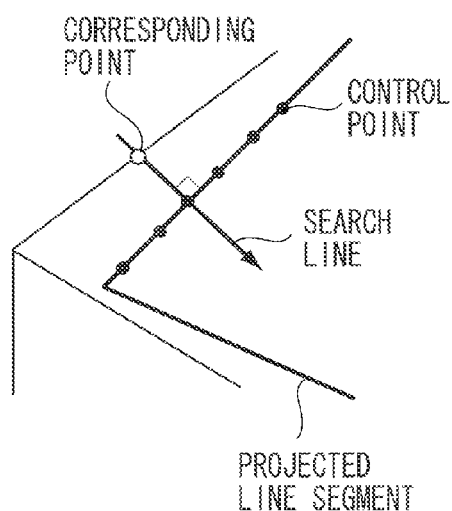
FIGS. 7A, 7B, and 7C illustrate edge detection.
Figure 7B:
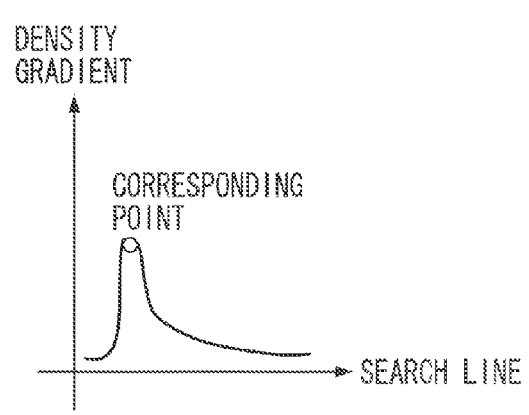
Figure 7C:
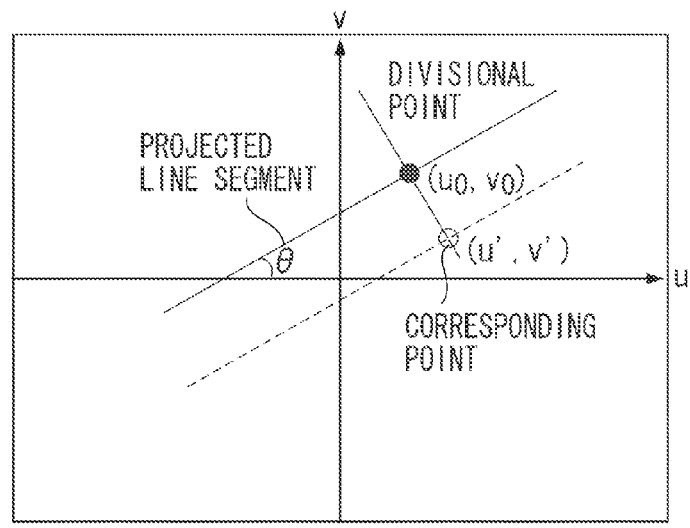

FIGS. 7A, 7B, and 7C illustrate the edge detection performed in the present exemplary embodiment. First, in step S601, the image feature extraction unit 520 performs a projection calculation on the image of a 3D geometric model of the measurement object 100 by using the input rough position and orientation of the measurement object 100. Thus, the image feature extraction unit 520 determines a projection image (line segment) of the edges constituting a 3D model on the image.

The projection onto the image of each line segment is only performed for the small regions on which the uniform white light for image feature extraction was projected in step S206. Specifically, even if an edge is present in the 3D model, due to the effects of environmental light and the like, in the actual environment it may not be possible to extract the corresponding edge feature from the image. Thus, as described in the present exemplary embodiment, by projecting the edges in the 3D model on only the regions determined in advance as having a dense edge feature distribution, and using only the edge information that can actually be extracted during the below-described position and orientation information calculation, the amount of calculation can be reduced.

Next, the image feature extraction unit 520 sets control points at equal intervals on each of the projected line segments. Then, the image feature extraction unit 520 sets a search line in the normal direction to the projected line segments, and performs one-dimensional edge detection (FIG. 7A). As illustrated in FIG. 7B, at the edge, the pixel value stands at the highest level in a density gradient. Consequently, when an edge is present nearby, a plurality of edges may be detected on the search line. In the present exemplary embodiment, a plurality of detected edges is stored as a hypothesis in a manner similar to that discussed in L. Vacchetti, V. Lepetit, and P. Fua's "Combining edge and texture information for real-time accurate 3D camera tracking", Proc. ISMAR04, pp. 48-57, 2004. Thus, the image feature extraction unit 520 searches for edges in the image which correspond to each control point, and applies a 3D line segment to the edges in the position and orientation calculation performed in step S604.

In step S603, the distance calculation unit 530 calculates the distance for the regions on which the pattern light for distance measurement is projected, on the image captured in step S207. The distance is calculated based on the position of a pixel in the image irradiated by the illumination unit 110, the position of a point on the image captured by the reflected light measurement unit 120 corresponding to the position of that pixel, and the relative position and orientation between the illumination unit 110 and an internal parameter in the reflected light measurement unit 120. For example, the distance may be calculated based on the method discussed in R. Hartley and A. Zisserman's "Multiple view geometry in computer vision Second Edition", Cambridge university Press, 2003. When the distance is calculated, the distance calculation unit 530 calculates point group data that has 3D coordinates in a coordinate system of the reflected light measurement unit 120. The 3D coordinates are calculated by multiplying the measurement data by a line-of-sight vector corresponding to the position of the point of the image captured by the reflected light measurement unit 120.

In step S604, the position and orientation calculation unit 540 calculates the position and the orientation of the measurement object 100 using the edge group detected in step S602 and the point group data calculated in step S603.

FIG. 8 is a flowchart illustrating a position and orientation calculation procedure. In this procedure, the position and the orientation are calculated by repeatedly correcting the rough values of the measurement object position and orientation (hereinafter, represented as "s") by an iterative operation based on the Gauss-Newton method. The method for calculating the measurement object position and orientation is not limited to the Gauss-Newton method. For example, the more robust Levenberg-Marquard method or the simpler steepest decent method may also be used. Further, other non-linear optimization techniques, such as the conjugate gradient method or the incomplete Cholesky conjugate gradient (ICCG) method, may also be used.

The position and orientation calculation unit 540 determines the distance to a line segment projected on the image based on the edge detected on the image and the estimated position and orientation, and the distance to the face to be converted into a coordinate system of the reflected light measurement unit 120 based on each point forming the point group data and the position and orientation. Then, the position and the orientation are optimized so that the sum of these distances is minimized. More specifically, the position and orientation calculation unit 540 expresses a signed distance of a straight line to a point on a two-dimensional (2D) image and a signed distance of a planar surface to a point in 3D space as a linear function of the minimal change of the position and the orientation of each object based on a linear Taylor expansion. The position and the orientation are repeatedly corrected by obtaining the minimal change of the position and the orientation according to a linear simultaneous equation relating to the minimal change of the position and the orientation which is set and solved so that the signed distance becomes 0.

In step S801, initialization is performed. In this step, the position and orientation calculation unit 540 sets the rough values for the position and the orientation of the measurement object 100 obtained in step S601.

In step S802, the position and orientation calculation unit 540 performs an associating operation. First, based on the rough values of the position and the orientation, the respective line segments in the 3D geometric model are projected onto the image and the coordinates of each face are converted into the coordinate system of the reflected light measurement unit 120. Next, the edges and the point group data are associated with each other. In step S602, a plurality of edges may be detected relating to each control point. In such a case, among the detected edges, the edge closet to the line segment projected based on the position and orientation rough values on the image is associated with the control point. Further, regarding the point group data, the position and orientation calculation unit 540 searches for the closest face in the 3D geometric model and associates this face based on the 3D coordinates in the coordinate system of the reflected light measurement unit 120 for each point.

In step S803, the position and orientation calculation unit 540 calculates a coefficient matrix and an error vector to solve the linear simultaneous equation. Each of the elements in this coefficient matrix is a linear partial differential coefficient for the minimal change of the position and orientation rough values. Concerning the edges, a partial differential coefficient of the image coordinates is calculated. Concerning the point group, a 3D coordinate partial differential coefficient is calculated. Concerning the edges, the error vector is the distance of the detected edge to the projected line segment on the image. Concerning the point group data, the error vector is the distance of the point to the face of the model in 3D space.

FIG. 7C illustrates a relationship between a projected image of a line segment and a detected edge. In FIG. 7C, the u axis represents the horizontal direction of the image and the v axis represents the vertical axis of the image. The position of a control point (a point that divides each projected line segment into equal intervals on the image) on the image is represented as $(u_0, v_0)$, and the slope on the image of the line segment to which that control point belongs is represented as slope $\theta$ with respect to the u axis. Slope $\theta$ is calculated by projecting the 3D coordinates of either end of the line segment on the image based on s, as the slope of the straight line connecting the two ends on the image. The normal vector on the image of this line segment is (sin θ, −cos θ). Further, the image coordinates of a point corresponding to the control point are (u', v'). The point (u, v) on the straight line that passes through (u', v') and has slope θ is represented by, $$u \sin \theta - v \cos \theta = d \quad (1)$$

(wherein θ is a constant). Here, d=u' sin θ−v' cos θ. The position of the control point on the image changes based on the position and the orientation of the measurement object. Further, the position and orientation of the measurement object have six degrees of freedom. More specifically, s is a six-dimensional vector, consisting of three elements that represent the position of the measurement object and three elements that represent the orientation of the measurement object. The three elements representing the orientation are expressed by, for example, a Euler angle or by a 3D vector in which direction is represented as a rotation axis and magnitude represented as a rotation angle. The image coordinates (u, v) of the control point that changes based on position and orientation can be approximated near $(u_0, v_0)$ as shown in Equation 2 based on a linear Taylor expansion in which $\Delta s_i$ (i=1, 2, . . . , 6) represents the minimal change of the respective components in s.

$$u \approx u_0 + \sum_{i=1}^{6} \frac{\partial u}{\partial s_i} \Delta s_i \quad (2)$$

$$v \approx v_0 + \sum_{i=1}^{6} \frac{\partial v}{\partial s_i} \Delta s_i$$

The position on the image of the control point obtained based on a correct s can be assumed to lie on the straight line represented by Equation 1. Formula 3 can be obtained by plugging u and v approximated based on Formula 2 into Equation 1.

$$\sin \theta \sum_{i=1}^{6} \frac{\partial u}{\partial s_i} \Delta s_i - \cos \theta \sum_{i=1}^{6} \frac{\partial v}{\partial s_i} \Delta s_i = d - r \quad (3)$$

(wherein $r=u_0 \sin \theta - v_0 \cos \theta$ (constant))

The 3D coordinates in the coordinate system of the reflected light measurement unit 120 can be converted into 3D coordinates (x, y, z) in the coordinate system of the measurement object based on the position and orientation s of the measurement object. Based on the rough position and orientation, a point is converted into a point $(x_o, y_o, z_o)$ in the measurement object coordinate system. (x, y, z) changes based on the position and the orientation of the measurement object, and can be approximated near $(x_o, y_o, z_o)$ as shown in Formula 4 based on a linear Taylor expansion.

$$x \approx x_0 + \sum_{i=1}^{6} \frac{\partial x}{\partial s_i} \Delta s_i \quad (4)$$

$$y \approx y_0 + \sum_{i=1}^{6} \frac{\partial y}{\partial s_i} \Delta s_i 0$$

$$z \approx z_0 + \sum_{i=1}^{6} \frac{\partial z}{\partial s_i} \Delta s_i$$

In step S802, the equation in the measurement object coordinate system of the face in the 3D geometric model associated with a point in the point group data is ax+by+cz=e ($a^2+b^2+c^2=1$, a, b, c and e are constants). The (x, y, z) converted based on the correct s is assumed to satisfy the planar equation ax+by+cz=e ($a^2+b^2+c^2=1$). Formula 5 can be obtained by plugging Equation 4 into the planer equation.

$$a \sum_{i=1}^{6} \frac{\partial x}{\partial s_i} \Delta s_i + b \sum_{i=1}^{6} \frac{\partial y}{\partial s_i} \Delta s_i + c \sum_{i=1}^{6} \frac{\partial z}{\partial s_i} \Delta s_i = e - q \quad (5)$$

(wherein $q=ax_o+by_o+cz_o$ (constants))

Formula 3 holds for all edges that were associated in step S802. Further, since Formula 5 holds for all point group data associated in step S802, a linear simultaneous equation holds regarding $\Delta s_i$ as shown in Equation 6.

$$\begin{bmatrix} \sin\theta_1 \frac{\partial u_1}{\partial s_1} - \cos\theta_1 \frac{\partial v_1}{\partial s_1} & \sin\theta_1 \frac{\partial u_1}{\partial s_2} - \cos\theta_1 \frac{\partial v_1}{\partial s_2} & \cdots & \sin\theta_1 \frac{\partial u_1}{\partial s_6} - \cos\theta_1 \frac{\partial v_1}{\partial s_6} \\ \sin\theta_2 \frac{\partial u_2}{\partial s_1} - \cos\theta_1 \frac{\partial v_2}{\partial s_1} & \sin\theta_2 \frac{\partial u_2}{\partial s_2} - \cos\theta_1 \frac{\partial v_2}{\partial s_2} & \cdots & in\theta_2 \frac{\partial u_2}{\partial s_6} - \cos\theta_1 \frac{\partial v_2}{\partial s_6} \\ \vdots & \vdots & \ddots & \vdots \\ a_1 \frac{\partial x_1}{\partial s_1} + b_1 \frac{\partial y_1}{\partial s_1} + c_1 \frac{\partial z_1}{\partial s_1} & a_1 \frac{\partial x_1}{\partial s_2} + b_1 \frac{\partial y_1}{\partial s_2} + c_1 \frac{\partial z_1}{\partial s_2} & \cdots & a_1 \frac{\partial x_1}{\partial s_6} + b_1 \frac{\partial y_1}{\partial s_6} + c_1 \frac{\partial z_1}{\partial s_6} \\ a_2 \frac{\partial x_2}{\partial s_1} + b_2 \frac{\partial y_2}{\partial s_1} + c_2 \frac{\partial z_2}{\partial s_1} & a_2 \frac{\partial x_2}{\partial s_2} + b_2 \frac{\partial y_2}{\partial s_2} + c_2 \frac{\partial z_2}{\partial s_2} & \cdots & a_2 \frac{\partial x_2}{\partial s_6} + b_2 \frac{\partial y_2}{\partial s_6} + c_2 \frac{\partial z_2}{\partial s_6} \\ \vdots & \vdots & \vdots & \vdots \end{bmatrix} \begin{bmatrix} \Delta s_1 \\ \Delta s_2 \\ \Delta s_3 \\ \Delta s_4 \\ \Delta s_5 \\ \Delta s_6 \end{bmatrix} = \begin{bmatrix} d_1 - r_1 \\ d_2 - r_2 \\ \vdots \\ e_1 - q_1 \\ e_2 - q_2 \\ \vdots \end{bmatrix} \quad (6)$$

Formula 6 is represented as shown in Formula 7.

$$J \Delta s = E \quad (7)$$

The partial differential coefficient used to calculate the coefficient matrix J in the linear simultaneous equation of Formula 6 is calculated based on, for example, a method discussed in V. Lepetit, and P. Fua's "Keypoint recognition using randomized trees" IEEE Transactions on Pattern Analysis and Machine Intelligence, Vol. 28, No. 9, 2006.

In step S804, the position and orientation calculation unit 540 determines Δs using a generalized inverse matrix $(J^T \cdot J)^{-1} \cdot J^T$ of matrix J based on Formula 7. However, since there are many outliers due to erroneous detection of edges and point group data, for example, a following robust estimation technique is used. Generally, outlier edges (point group data) have a large error d−r (e−q). Consequently, such outlier edges have a large effect on the simultaneous equations of Equations 6 and 7, so that the accuracy of the obtained Δs deteriorates. Therefore, data having a large error d−r (e−q) is given a small weighting, and data having a small error d−r (e−q) is given a large weighting. The weighting may be applied based on a Tukey function like that illustrated in Formula 8, for example.

$$w(d-r) = \begin{cases} (1-((d-r)/c_1)^2)^2 & |d-r| \le c_1 \\ 0 & |d-r| > c_1 \end{cases}$$

$$w(e-q) = \begin{cases} (1-((e-q)/c_2)^2)^2 & |e-q| \le c_2 \\ 0 & |e-q| > c_2 \end{cases}$$ (8)

(wherein $c_1$ and $c_2$ are constants). The weighting function does not have to be a Tukey function. Any function that gives a small weighting to data having a large error and a large weighting to data having a small error can be used, such as a Huber function. The weighting for each piece of data (edge or point group data) is denoted as $w_i$. A weighting matrix W is defined as shown in Formula 9.

$$W = \begin{bmatrix} w_1 & & & 0 \\ & w_2 & & \\ & & \ddots & \\ 0 & & & w_{N_c} \end{bmatrix}$$ (9)

The weighting matrix W is a square matrix in which all values are 0 except for the diagonal components. The weighting $w_i$ is entered in the diagonal components. Using this weighting matrix W, Formula 7 is transformed to Formula 10.

WJΔs=WE (10)

A correction value Δs is determined by solving Formula 10 as shown in Formula 11.

Δs=$(J^T WJ)^{-1} J^T WE$ (11)

In step S805, the position and orientation calculation unit 540 corrects the position and orientation rough values based on the position and orientation correction value Δs calculated in step S804.

In step S806, the position and orientation calculation unit 540 performs a convergence determination. If it is determined that convergence has occurred (YES in step S806), the position and orientation calculation unit 540 finishes the processing. If it is determined that convergence has not occurred (NO in step S806), the processing returns to step S802. In the convergence determination, convergence is determined as having occurred if the correction value Δs is about 0 or the difference in the square sum of the error vectors before and after correction is about 0.

By executing the above-described processing procedure, the position and the orientation of the measurement object can be calculated using a 2D image feature and a 3D distance image in a complementary manner.

The method for calculating the position and orientation information is not limited to that described above. Any method may be used as long as it utilizes a 2D image feature and a 3D distance image in a complementary manner. More specifically, the key feature is that pattern light is projected that mixes a pattern light characteristic for distance measurement and a pattern light characteristic for image feature extraction, by changing the pattern characteristics projected on the measurement object based on a measurement object image feature and distribution characteristic. This method is valid for any position and orientation calculation method that utilizes a 2D image feature and a 3D distance image in a complementary manner.

For example, this calculation may be performed by simple pattern matching with a 2D projection model of the measurement object using edge information, which is a 2D feature, and 3D pattern matching between 3D distance data and a 3D model of the measurement object. Then, a matching evaluation is performed by adding an evaluation function of both pattern matching based on a predetermined weighting.

As described above, in the first exemplary embodiment, pattern light that mixes a pattern light characteristic for distance measurement and a pattern light characteristic for image feature extraction is projected based on the measurement object image feature and distribution characteristic. Consequently, since the image feature and the distance image can be simultaneously acquired, position and orientation measurement can be executed that utilizes a 2D image feature and a 3D distance image in a complementary manner. At that time, information can be acquired that matches the actual environment, such as the illumination environment, in fewer imaging operations.

A second exemplary embodiment is different from the first exemplary embodiment in irradiating with pattern light for distance measurement as basic pattern light, and setting a pattern light characteristic that mixes pattern light for image feature extraction and pattern light for distance measurement based on the continuity of the pattern light in the captured image. Therefore, in the second exemplary embodiment, only the differences with the first exemplary embodiment will be described. A description of the other parts will be omitted.

The measurement device according to the second exemplary embodiment has the same configuration as the measurement device according to the first exemplary embodiment. However, the image feature extraction unit 130 executes binary processing on the image captured by the reflected light measurement unit 120, and calculates a binary image. In the present exemplary embodiment, as described below, since slit light is projected as the basic pattern light, by executing binary processing the profile of the slit light can be extracted as an image feature.

Further, similar to the first exemplary embodiment, the feature distribution calculation unit 180 calculates a distribution characteristic of the image feature for each local region in the image extracted by the image feature extraction unit 130. However, in the present exemplary embodiment, the distribution characteristic means calculating the continuity of the slit light.

Similar to the first exemplary embodiment, the pattern light control unit 170 controls the pattern light characteristics based on information about the distribution characteristic for each local region of the image feature calculated by the feature distribution calculation unit 180. In the present exemplary embodiment, as described above, the distribution characteristic for each local region of the image feature means the continuity of the slit light.

Figure 9:
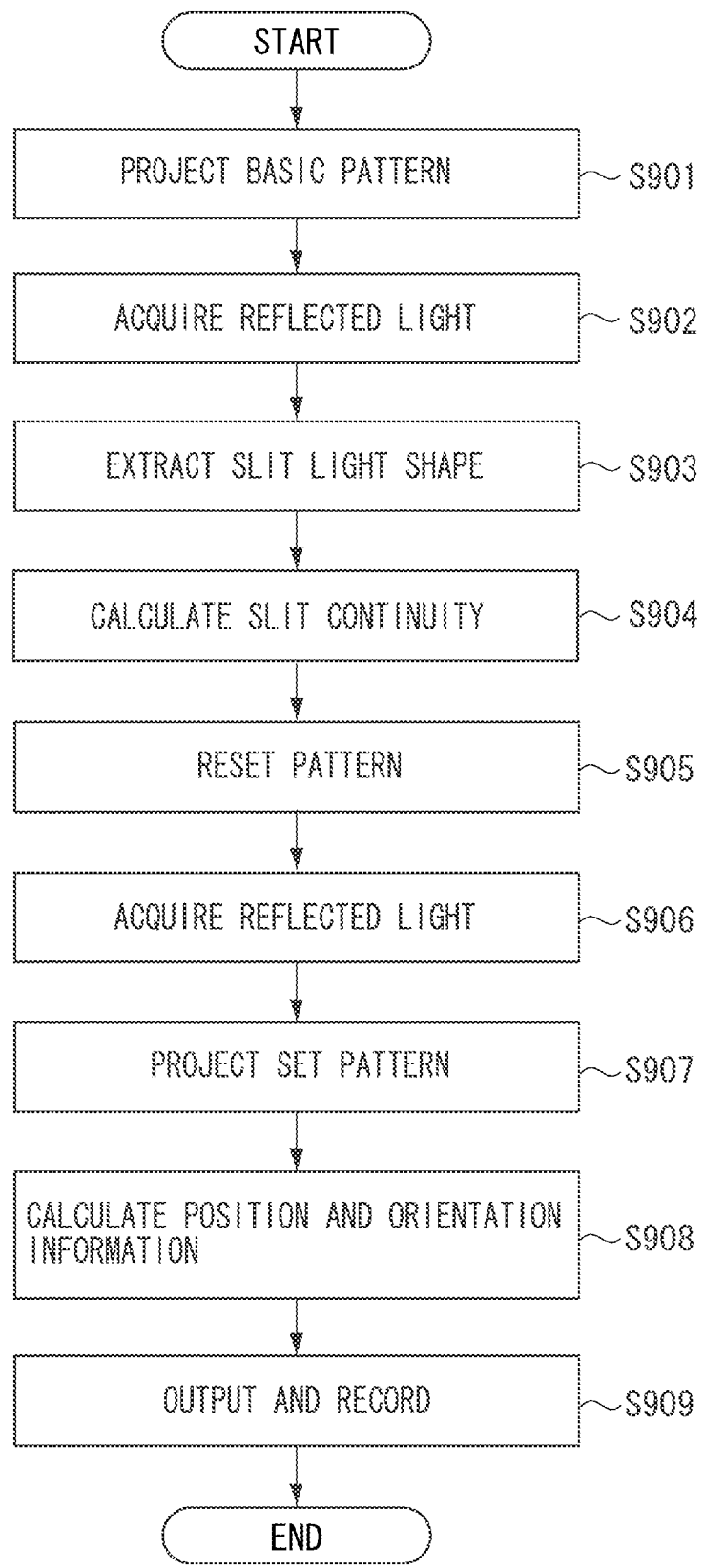
FIG. 9 is a flowchart illustrating a measurement processing flow.
Figure 10A:
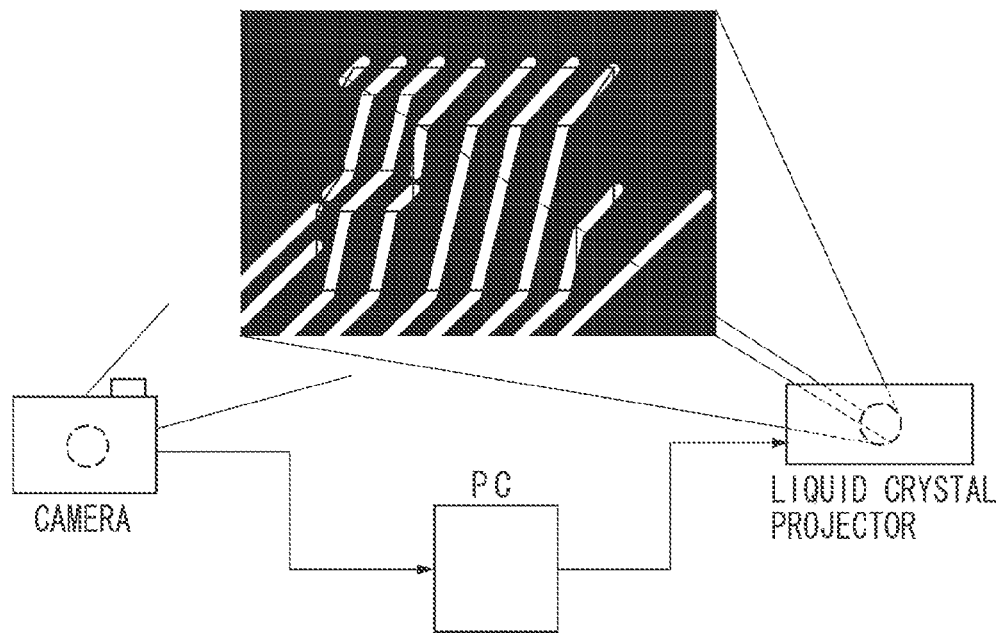
FIGS. 10A and 10B illustrate slit light irradiation.
Figure 10B:
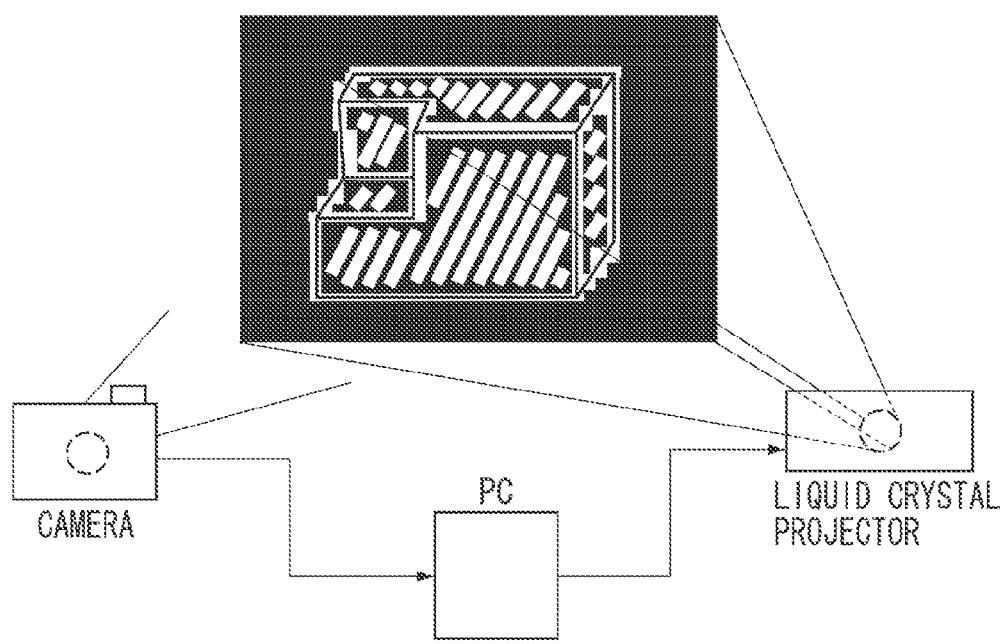

FIG. 9 is a flowchart illustrating a flow of the measurement processing according to the second exemplary embodiment. FIGS. 10A and 10B illustrate examples when slit light is irradiated on the measurement object 100 from the illumination unit 110. In FIGS. 10A and 10B, a liquid crystal projector is used as the illumination unit 110. FIGS. 11A to 11D and FIGS. 12A to 12D illustrate images obtained by irradiating with slit light.

In step S901, the control unit 160 transmits a basic pattern light setting signal to the illumination unit 110, and the pattern light characteristic setting unit 112 sets an illumination light characteristic as the basic pattern light. In the present exemplary embodiment, as the basic pattern light, slit light for distance measurement is set. Then, the illumination unit 110 irradiates the measurement object 100 with the set basic pattern light.

Figure 11A:
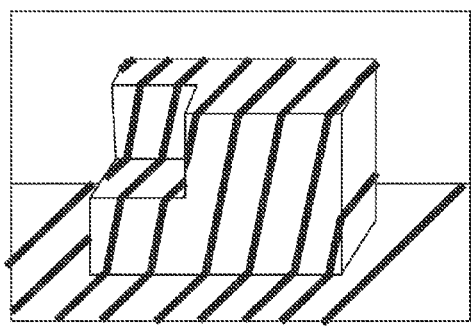
FIGS. 11A, 11B, 11C, and 11D illustrate images obtained by irradiation of slit light.
Figure 11B:
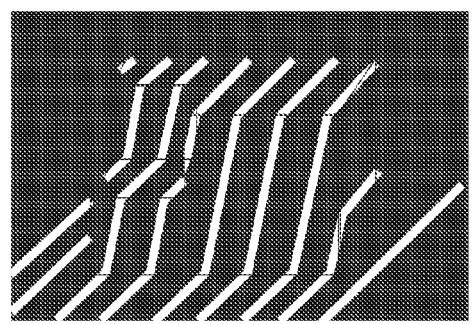

In FIG. 11A, to easily understand the positional relationship between the slit light projection position and the measurement object 100, the position where the slit light is projected on the measurement object is indicated by a black stripe pattern. FIG. 11B illustrates a state in which the object is irradiated with the slit light. In the present exemplary embodiment, the measurement object 100 is placed on a platform.

In step S902, the reflected light measurement unit 120 measures the reflected light of the measurement object 100. Similar to the first exemplary embodiment, measurement of the reflected light corresponds to capturing the measurement object in a state in which the object is irradiated with pattern light. At this stage, an image illustrated in FIG. 10A is obtained as the image captured by the reflected light measurement unit 120.

In step S903, the image feature extraction unit 130 extracts information about the image feature in the captured image. In the present exemplary embodiment, a profile of the slit light is extracted as the image feature by performing binary processing on the captured image. An example of the extracted binary image is illustrated in FIG. 11B. From FIG. 11B, it can be seen that the slit light profile can be extracted as the image feature by generating a binary image from an image irradiated with slit light.

Figure 11C:
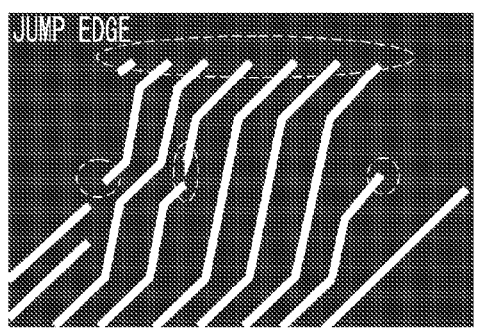

At this stage, as can be seen from the portion enclosed by a dotted line in FIG. 11C, when slit light is projected on a discontinuous face of the measurement object 100, the slit light breaks at the boundary of the discontinuous face. This is typically called a "jump edge".

At the jump edge portion, since the slit light breaks, it becomes difficult to find the slit light, which should be continuous. Consequently, it is difficult to calculate the distance data based on projection of the pattern light for distance measurement. Further, a jump edge portion is a section where a measurement object edge is present, so that it should be easy to extract the edge feature as an image feature.

Figure 11D:
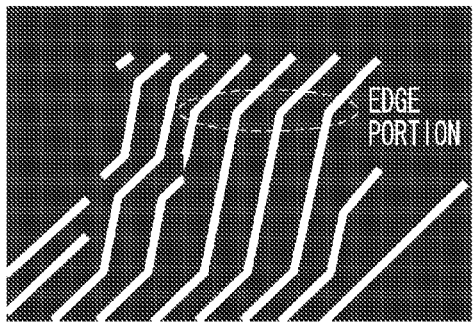

In addition, as can be seen from the portion enclosed by the dotted line in FIG. 11D, other than jump edges, the slit light sharply inflects at edge portions present on the boundary of continuous faces of the measurement object 100. Therefore, it should be easy to extract the edge feature as an image feature at sections in the image where the slit light sharply inflects.

In step S904, the feature distribution calculation unit 180 calculates the distribution characteristic for each local region in the image of the slit light extracted in step S903. The "distribution characteristic of the slit light" according to the present exemplary embodiment means the continuity for each local region of the slit light in the image and the distribution of the inflected sections.

First, the feature distribution calculation unit 180 performs thinning processing on the binary image obtained by the image feature extraction unit 130, and converts the slit light line width of the locus in the image into one pixel. Although there are many examples of thinning processing methods, such as Hilditch, Tamura, and Zhang Suen, in the present exemplary embodiment, Tamura's method as discussed in "Computer Image Processing" by Hideyuki Tamura, pp. 158- 162, Ohmsha Ltd., December 2002, is used. An example of a binary image after thinning processing is illustrated in FIG. 12A.

Figure 12A:
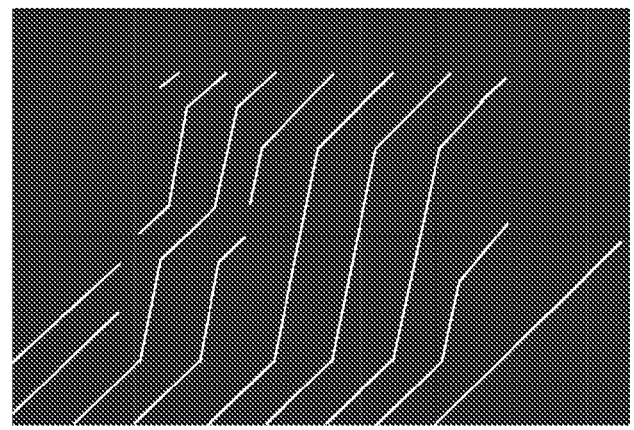
FIGS. 12A, 12B, 12C, and 12D illustrate images obtained by irradiation with slit light.
Figure 12B:
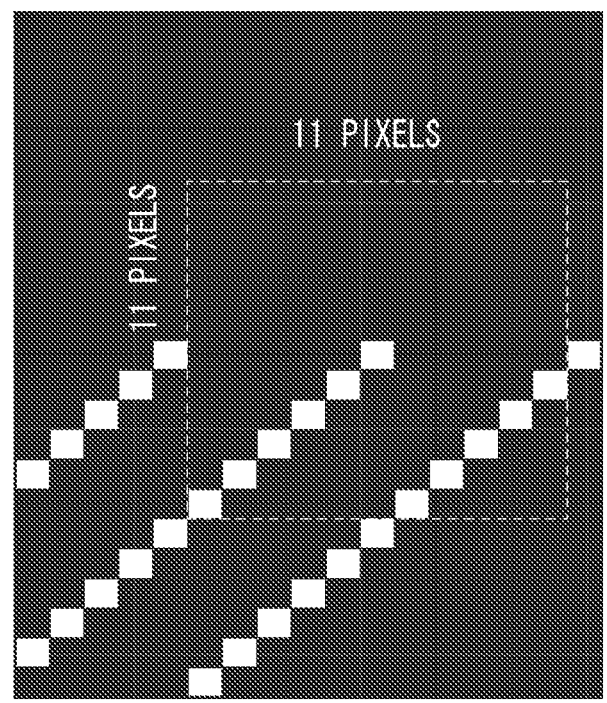

Next, regarding all of the pixels having "1" (high) as a pixel value in FIG. 12A, the pixel value of the adjacent pixels is referred to. FIG. 12B illustrates an image in which a part of FIG. 12A is displayed in an enlarged manner. In FIG. 12B, one square represents one pixel. Specifically, as illustrated in FIG. 12B, when only one pixel among the adjacent pixels has a "1" (high) as a pixel value, this indicates that the slit light breaks in the vicinity of the reference source pixel.

In step S905, the pattern light control unit 170 transmits a pattern light setting signal to the illumination unit 110 based on the continuity of the slit light in the image calculated in step S904. Based on this pattern light setting signal, the pattern light characteristic setting unit 112 resets the illumination light characteristic. This illumination light characteristic sets pattern light that mixes pattern light for distance measurement and pattern light for image feature extraction, so that the pattern light for distance measurement is projected on the portion where the slit light is continuous, and uniform white light is projected as pattern light for image feature extraction on the portion where slit light breaks.

More specifically, the pattern light characteristic setting unit 112 sets small regions around the pixels where the slit light is presumed to break as the regions where the pattern light for image feature extraction (i.e., uniform white light) is projected. In this case, the size of the small regions can be appropriately set based on the line width and the line interval of the projected slit light, for example.

For example, when the slit light has a line width of 3 pixels and a line interval of 2 pixels, as illustrated in FIG. 12B, the small region size may be set, for example, as 11×11 pixels. Consequently, as illustrated in FIG. 12D, the portion where the slit light breaks, specifically, the section corresponding to the jump edge, can be set as the region on which the pattern light for image feature extraction (i.e., uniform white light) is projected.

The method for calculating the continuity of the slit light is not limited to that described above. Any method may be used, as long as it can appropriately calculate the continuity of the slit light.

In the present exemplary embodiment, based on the following method, the feature distribution calculation unit 180 calculates a section in the image where the slit light sharply inflects. First, in the same manner as described above, the feature distribution calculation unit 180 performs thinning processing on the binary image obtained by the image feature extraction unit, and converts the slit light line width of the locus on the image into one pixel.

Figure 12C:
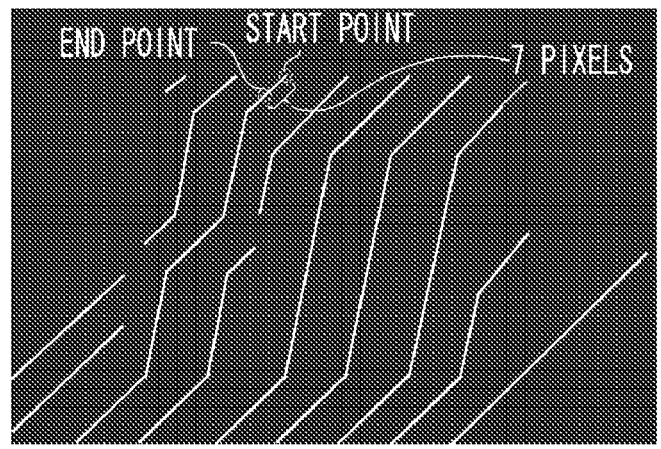
Figure 12D:
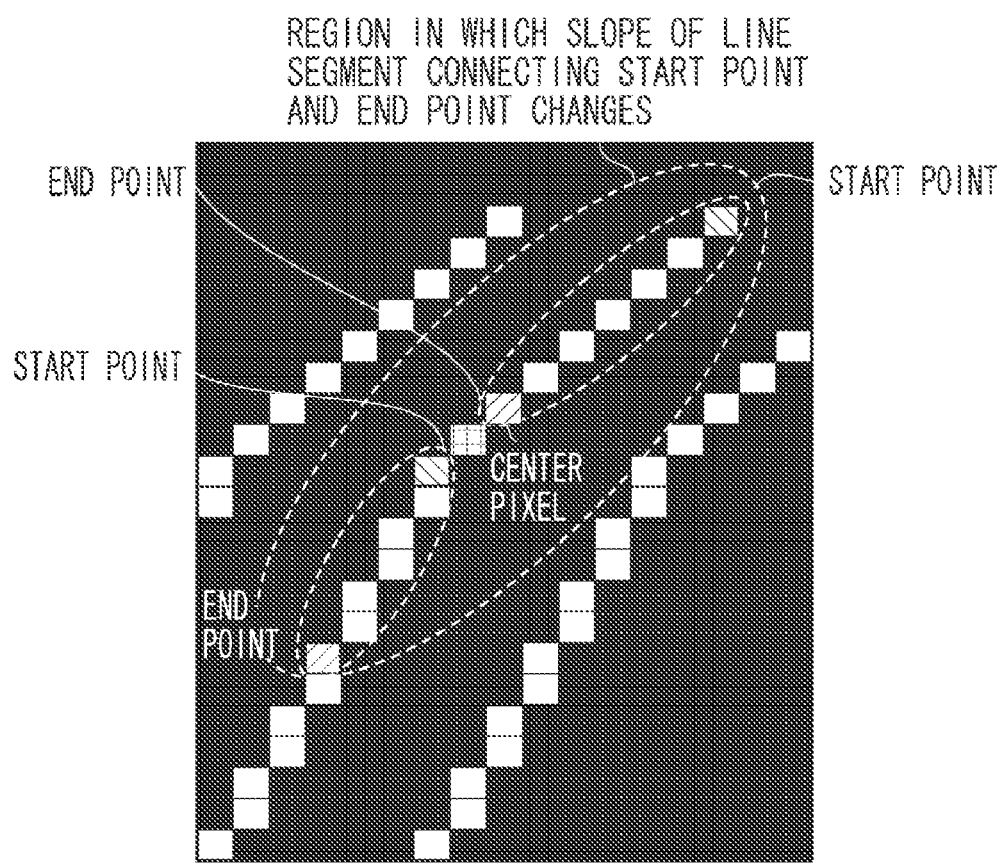

Next, as illustrated in FIG. 12C, a pixel presumed to correspond to the portion where the slit light breaks as calculated by the above method is set as a start point. In FIG. 12C, the pixel corresponding to the start point is enclosed by a white dotted line.

Next, a pixel that is a separated by a predetermined number of pixels is set as an endpoint by sequentially tracking back from the set start pixel along the pixels having a pixel value of 1 (high) among the adjacent pixels. In FIG. 12C, the pixel corresponding to the end point is enclosed by a white dotted line. The predetermined number of pixels may be appropriately selected. In the present exemplary embodiment, this number is seven pixels.

Then, based on the position coordinates of the pixel set as the start point and the pixel set as the end point on the image, the slope of a line segment connecting the start point pixel and the end point pixel is calculated. This processing is successively repeated on each pixel shifted and set one by one as the start point, until a pixel is reached that is presumed to correspond to where the slit light breaks as the end point.

As illustrated in FIG. 12D, when the pixels set as a start point and an end point straddle a section where the slit light is sharply inflected, the slope of the line segment changes. FIG. 12D illustrates an image in which a part of FIG. 12C is displayed in an enlarged manner. In FIG. 12D, one square represents one pixel. Therefore, in the pixel regions within the range where the calculated slope of the line segment changes, a measurement object edge can be presumed to be present in the pixel position corresponding to the center.

The regions where an edge is presumed to be present can also be determined by comparing the amount of change in the slope of the line segment with a predetermined threshold, and it is determined that an edge is present in the pixel regions whose amount of change is equal to or greater than this threshold.

Further, in step S905, the pattern light characteristic setting unit 112 sets the small regions around the pixels where an edge is presumed to be present, as the regions where the pattern light for image feature extraction (i.e., uniform white light) is projected. In this case, the size of the small regions can be appropriately set based on the line width and the line interval of the projected slit light, for example.

For example, when the slit light has a line width of 3 pixels and a line interval of 2 pixels, the small region size may be set, for example, as 11×11 pixels. Consequently, the portion where the slit light inflects, specifically, the section corresponding to an edge, can be set as the region on which the pattern light for image feature extraction (i.e., uniform white light) is projected.

The method for calculating the position where the slit light sharply inflects is not limited to that described above. Any method may be used, as long as it can appropriately calculate the position where the slit light sharply inflects.

In step S905, the pattern light characteristic setting unit 112 sets, as described above, uniform white light as the pattern light characteristic for image feature extraction in the regions surrounding the section where the slit light breaks on the image (corresponding to a jump edge) and the regions surrounding the section where the slit light sharply inflects (corresponding to an edge). For the other regions, the pattern light characteristic setting unit 112 sets pattern light for distance measurement.

There is typically an offset in the arrangement of the reflected light measurement unit 120 and the illumination unit 110. Therefore, in the same manner as in exemplary embodiment 1, positions on the image captured by the reflected light measurement unit 120 are converted into pixel positions of the illumination pattern of the illumination unit 110 by utilizing the geometrical relationship between the reflected light measurement unit 120 and the illumination unit 110. Concerning the processing executed in the following steps S906 to S909, since this is the same as the processing of steps S206 to S209 in exemplary embodiment 1, a detailed description thereof is omitted here.

In the present exemplary embodiment, although slit light is used as the pattern light for distance measurement, the present invention is not limited to this. Pattern light having a different profile to slit light can be used to extract the jump edges and the edges portions of the measurement object, as long as such pattern light can be used to calculate local continuity in an image.

As described above, in the second exemplary embodiment, pattern light that mixes a pattern light characteristic for distance measurement and a pattern light characteristic for image feature extraction is projected based on the measurement object image feature and distribution characteristic. Consequently, the image feature and the distance image can be simultaneously acquired. Therefore, when executing position and orientation measurement that utilizes a 2D image feature and a 3D distance image in a complementary manner, information can be acquired that matches the actual environment, such as the illumination environment, in fewer imaging operations.

In the above-described first and second exemplary embodiments, an edge feature was extracted as the image feature by an image feature extraction unit and a position and orientation information calculation unit. However, the image feature is not limited to an edge. As discussed in the above "Keypoint recognition using randomized trees", the position and orientation information can also be calculated by, for example, detecting a feature point from an image using a Harris detector and applying a point of a 3D model projected on an image to the feature point.

Further, in step S204, when setting the region to which the illumination for distance measurement is given, the below-described method in which information about a feature point is used, may be employed. Specifically, in the same manner as in step S204 described in the first exemplary embodiment, the image is divided into small regions and the value of the feature point in the small regions is added. A neighborhood of the small region having a predetermined value or greater can be set as the region to which the illumination for distance measurement is given. Instead of a Harris detector, a similar calculation can be executed by the image feature extraction unit and the position and orientation information calculation unit using an appropriate image feature amount, such as a scale-invariant feature transform (SIFT) image feature amount or a histogram of oriented gradients (HoG) feature amount.

In the first and second exemplary embodiments, slit light was used as the pattern light for distance measurement. However, the pattern light for distance measurement is not limited to slit light. For example, one or a plurality of spot lights may also be used. Further, a random dot pattern or space coded pattern may be used. Distance data can be calculated by the position and orientation information calculation unit using these pattern lights. A more detailed description may be found in the above "Fitting parameterized three-dimensional models to images".

In the first and second exemplary embodiments, a liquid crystal projector is used as the pattern light projection means, however, the present invention is not limited to this. For example, instead of a liquid crystal projector, a configuration that combines a digital mirror device (DMD) and a light source can be used. Alternatively, a configuration that combines a 2D multi-array light source and a microelectromechanical system (MEMS) mirror can be used. Any pattern light projection means can be used, as long as such means can project arbitrary pattern light.

In addition, the present invention may be applied to a system which is configured of a plurality of devices (e.g., a host computer, interface device, reader, printer etc.), or applied to an apparatus (e.g., a copying machine, facsimile apparatus etc.) configured of one device.

Further, the present invention can also be realized by supplying software (a program) for realizing the functions of the above exemplary embodiments to a system or an apparatus via a network or via various storage media, and having a computer (or a CPU or a micro processing unit (MPU)) of the system or apparatus read and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-244369 filed Oct. 29, 2010, which is hereby incorporated by reference herein in its entirety.

What is claimed is:

1. A measurement device comprising:
   a setting unit configured to set a pattern light characteristic of an illumination light to be projected onto a measurement object;
   a reflected light measurement unit configured to measure reflected light when the measurement object is irradiated with the illumination light;
   an extraction unit configured to extract from the measured reflected light an image feature based on a physical characteristic of the measurement object;
   a calculation unit configured to calculate a distribution characteristic for each local region of the image feature; and
   a control unit configured to control the setting unit to reset the pattern light characteristic of the illumination light for respective local regions, in which a first pattern light characteristic for distance measurement and a second pattern light characteristic for image feature extraction are mixed, based on the calculated distribution characteristic for each local region of the image feature.

2. The measurement device according to claim 1, wherein the calculation unit is configured to calculate an image feature density distribution as the distribution characteristic for each local region of the image feature.

3. The measurement device according to claim 1, wherein the calculation unit is configured to calculate image feature continuity as the distribution characteristic for each local region of the image feature.

4. The measurement device according to claim 1, wherein the pattern light characteristic for distance measurement is a space coded pattern in which space is coded based on a geometric pattern.

5. The measurement device according to claim 1, wherein the pattern light characteristic for image feature extraction is a uniform pattern that irradiates with light in a spatially uniform manner.

6. The measurement device according to claim 1, further comprising:
   a holding unit configured to hold a 3D geometric model of the measurement object;
   an input unit configured to input a rough position and orientation of the measurement object; and
   a position and orientation measurement unit configured to measure the measurement object position and orientation by applying the 3D geometric model to an image feature in the measurement object based on the rough position and orientation of the measurement object.

7. A measurement method comprising:
   setting a pattern light characteristic of an illumination light to be projected onto a measurement object;
   measuring reflected light when the measurement object is irradiated with the illumination light;
   extracting from the measured reflected light an image feature based on a physical characteristic of the measurement object;
   calculating a distribution characteristic for each local region of the image feature; and
   controlling setting to reset the pattern light characteristic of the illumination light for respective local regions, in which a first pattern light characteristic for distance measurement and a second pattern light characteristic for image feature extraction are mixed, based on the calculated distribution characteristic for each local region of the image feature.

8. A storage medium storing a control program which causes a computer to execute each of the measurement method according to claim 7.

* * * * *